US012691761B2

(12) United States Patent
Lewis

(10) Patent No.: US 12,691,761 B2
(45) Date of Patent: Jul. 28, 2026

(54) CHARGING SYSTEM FOR AN ELECTRIC WORK VEHICLE AND ASSOCIATED METHOD

(71) Applicant: CNH Industrial America LLC, New Holland, PA (US)

(72) Inventor: Brady Lewis, Peck, KS (US)

(73) Assignee: CNH Industrial America LLC, New Holland, PA (US)

( * ) Notice: Subject to any disclaimer, the term of this patent is extended or adjusted under 35 U.S.C. 154(b) by 218 days.

(21) Appl. No.: 18/457,715

(22) Filed: Aug. 29, 2023

(65) Prior Publication Data

US 2024/0066991 A1     Feb. 29, 2024

Related U.S. Application Data

(60) Provisional application No. 63/402,491, filed on Aug. 31, 2022.

(51) Int. Cl.
B60L 1/00         (2006.01)
B60L 53/16        (2019.01)
         (Continued)

(52) U.S. Cl.
CPC .............. B60L 1/006 (2013.01); B60L 53/16 (2019.02); B60L 58/12 (2019.02); H02J 7/80 (2026.01); H02J 7/933 (2026.01)

(58) Field of Classification Search
CPC .......... B60L 1/006; B60L 53/16; B60L 58/12; B60L 2200/40; B60L 2240/547;
         (Continued)

(56) References Cited

U.S. PATENT DOCUMENTS 6,199,307 B1 * 3/2001 Kagoshima ............. E02F 3/325
                                                      60/420
10,800,279 B2 * 10/2020 Bhat ....................... B60L 53/14
              (Continued)

FOREIGN PATENT DOCUMENTS

CN        206349777 U    7/2017
CN        207053260 U    2/2018
              (Continued)

*Primary Examiner* — Daniel C Puentes
*Assistant Examiner* — Michael J Warmflash
(74) *Attorney, Agent, or Firm* — Dority & Manning, P.A.

(57)         ABSTRACT

An electric work vehicle includes a frame and a traction device coupled to the frame. Furthermore, the electric work vehicle includes an electric motor configured to drive the traction device and an energy storage device configured to supply electric energy to the electric motor. Additionally, the electric work vehicle includes an electric charging port configured to receive electric power from a power source, with the electric charging port being electrically coupled to the energy storage device. Moreover, the electric work vehicle includes an electric outlet configured to provide electric power to a remote device, with the electric outlet being electrically coupled to the electric charging port and the energy storage device. In addition, the electric work vehicle includes a computing system configured to control a distribution of the electric power received by the electric charging port between the energy storage device and the electric outlet.

20 Claims, 5 Drawing Sheets

(51) Int. Cl.
    *B60L 58/12*         (2019.01)
    *H02J 7/80*         (2026.01)
    *H02J 7/90*         (2026.01)

(58) Field of Classification Search
    CPC .......... B60L 50/60; B60L 53/14; B60L 58/10;
               H02J 7/0047; H02J 7/00712; Y02T 10/70
    See application file for complete search history.

(56) References Cited

U.S. PATENT DOCUMENTS

| | | | | |
|---|---|---|---|---|
| 11,939,745 | B2 * | 3/2024 | Ishii ...................... | E02F 9/2004 |
| 2005/0262838 | A1 * | 12/2005 | Kageyama ............ | F15B 21/085 |
| | | | | 60/453 |
| 2012/0205945 | A1 * | 8/2012 | Taylor ..................... | B60N 3/06 |
| | | | | 296/190.08 |

| | | | | |
|---|---|---|---|---|
| 2013/0127244 | A1 * | 5/2013 | Handa .............. | B60W 50/0097 |
| | | | | 307/9.1 |
| 2018/0251169 | A1 * | 9/2018 | Lewis ........................ | E02F 9/02 |
| 2023/0211684 | A1 * | 7/2023 | Yerli ...................... | B60L 53/38 |
| | | | | 307/104 |
| 2023/0406150 | A1 * | 12/2023 | Choi ........................ | B60L 58/12 |
| 2024/0010062 | A1 * | 1/2024 | Hooton ................... | B60L 50/66 |
| 2024/0059181 | A1 * | 2/2024 | Edwards ................. | B60L 50/15 |
| 2024/0066991 | A1 * | 2/2024 | Lewis .................... | B60L 53/16 |
| 2024/0067046 | A1 * | 2/2024 | Mu ......................... | B60L 53/22 |
| 2024/0075826 | A1 * | 3/2024 | Miller .................... | B60L 55/00 |
| 2024/0101274 | A1 * | 3/2024 | Roebuck ................ | B60L 50/66 |

FOREIGN PATENT DOCUMENTS

| | | | | |
|---|---|---|---|---|
| CN | 211391395 | U | 9/2020 | |
| EP | 2597005 | A2 * | 5/2013 | ............ B60W 10/30 |
| EP | 2597005 | B1 * | 3/2020 | ........ B60W 30/1886 |
| JP | 2008069517 | A | 3/2008 | |

* cited by examiner

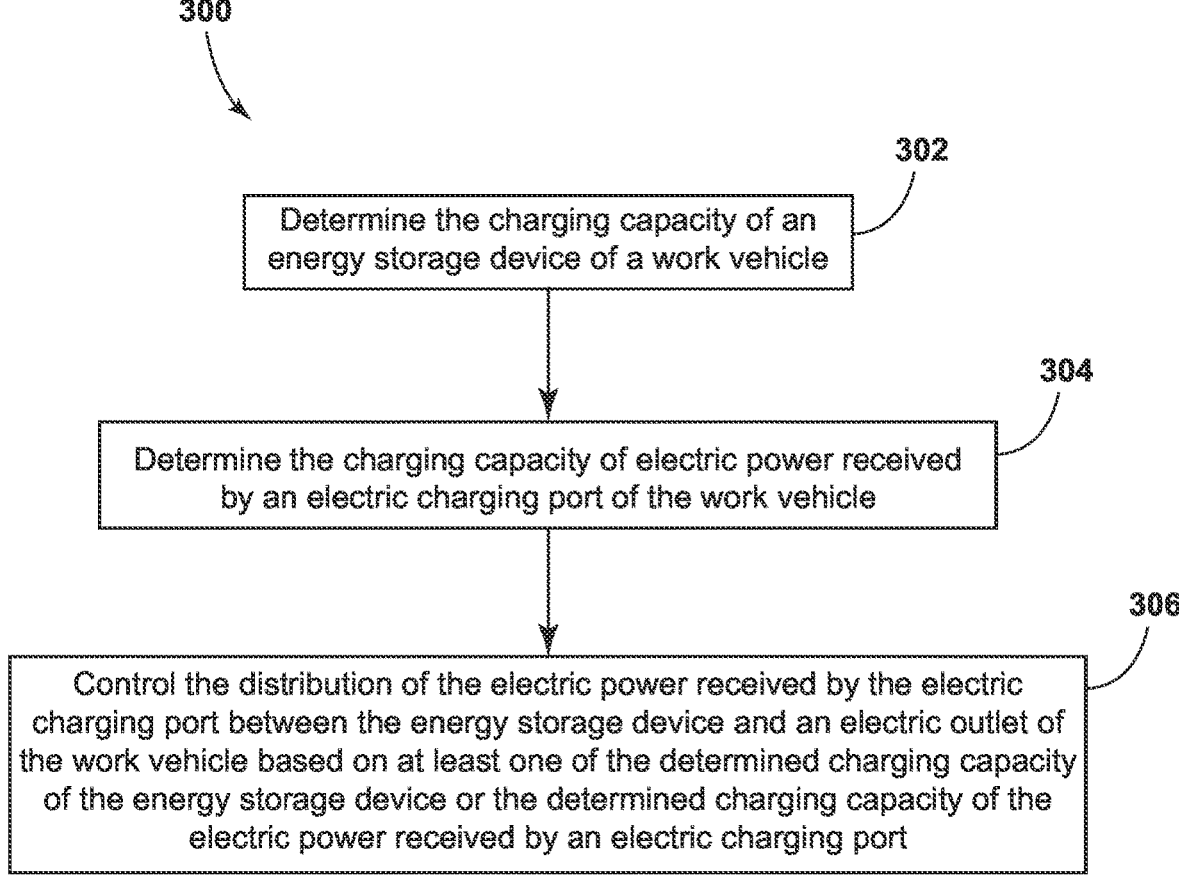

300

302

Determine the charging capacity of an
energy storage device of a work vehicle

304

Determine the charging capacity of electric power received
by an electric charging port of the work vehicle

306

Control the distribution of the electric power received by the electric
charging port between the energy storage device and an electric outlet of
the work vehicle based on at least one of the determined charging capacity
of the energy storage device or the determined charging capacity of the
electric power received by an electric charging port

FIG. 5

CHARGING SYSTEM FOR AN ELECTRIC WORK VEHICLE AND ASSOCIATED METHOD

CROSS-REFERENCE TO RELATED APPLICATIONS

This application is based upon and claims the right of priority to U.S. Provisional Patent Application No. 63/402,491, filed on Aug. 31, 2022, the disclosure of which is hereby incorporated by reference herein in its entirety for all purposes.

FIELD OF THE INVENTION

The present disclosure generally relates to electric work vehicles and, more particularly, to systems and methods for charging electric work vehicles.

BACKGROUND OF THE INVENTION

Work vehicles, such as backhoe loaders, wheel loaders, skid steer loaders, compact track loaders, and the like, are a mainstay of construction work and industry. As such, work vehicles typically include one or more implements for carrying materials, such as gravel, sand, or dirt, around a worksite. For example, backhoe loaders include a chassis, a loader assembly coupled to the front of the chassis, and a backhoe assembly coupled to the rear of the chassis.

For many years, work vehicles have generally relied on an internal combustion engine to power the vehicle. However, in recent years, interest in electric work vehicles has increased. Electric work vehicles do not include an internal combustion engine. Instead, electric work vehicles rely on one or more electric motors powered by an energy storage device(s), such as a battery module, to power its components.

Unlike internal combustion engine powered work vehicle, which can be quickly and easily refueled with a liquid fuel, the energy storage device(s) of an electric work vehicle must be charged by an electric power source (e.g., the power grid). However, electric power sources at work sites are generally limited, particularly during the early phases of construction. Moreover, other electrically powered devices (e.g., power tools) that rely on such electric power sources for charging are commonly used at work sites. In this respect, it can be challenging to maintain sufficient charging of electric work vehicles and the other electrically powered devices at a construction work site.

Accordingly, an improved charging system for an electric work vehicle and an associated method would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an electric work vehicle including a frame and a traction device coupled to the frame. Furthermore, the electric work vehicle includes an electric motor configured to drive the traction device and an energy storage device configured to supply electric energy to the electric motor. Additionally, the electric work vehicle includes an electric charging port configured to receive electric power from a power source, with the electric charging port being electrically coupled to the energy storage device. Moreover, the electric work vehicle includes an electric outlet configured to provide electric power to a remote device, with the electric outlet being electrically coupled to the electric charging port and the energy storage device. In addition, the electric work vehicle includes a computing system configured to control a distribution of the electric power received by the electric charging port between the energy storage device and the electric outlet.

In another aspect, the present subject matter is directed to a system for charging an electric work vehicle. The system includes an electric motor configured to drive a traction device of the electric work vehicle and an energy storage device configured to supply electric energy to the electric motor. Furthermore, the system includes an electric charging port configured to receive electric power from a power source, with the electric charging port being electrically coupled to the energy storage device. Additionally, the system includes an electric outlet configured to provide electric power to a remote device, with the electric outlet being electrically coupled to the electric charging port and the energy storage device. Moreover, the system includes a computing system configured to control a distribution of the electric power received by the electric charging port between the energy storage device and the electric outlet.

In a further aspect, the present subject matter is directed to a method for charging an electric work vehicle. The electric work vehicle, in turn, includes an electric motor configured to drive a traction device of the electric work vehicle and an energy storage device configured to supply electric energy to the electric motor. The method includes determining, with a computing system, a charging capacity of the energy storage device. In addition, the method includes determining, with the computing system, a charging capacity of electric power received by an electric charging port on the electric work vehicle. The electric charging port, in turn, is configured to receive the electric power from a power source, with the electric charging port being electrically coupled to the energy storage device. Furthermore, the method includes controlling, with the computing system, a distribution of the electric power received by the electric charging port between the energy storage device and an electric outlet based on at least one of the determined charging capacity of the energy storage device or the determined charging capacity of the electric power received by an electric charging port. The electric outlet, in turn, is configured to provide electric power to a remote device, with the electric outlet being electrically coupled to the electric charging port and the energy storage device.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 5 illustrates a flow diagram of one embodiment of a method for charging an electric work vehicle in accordance with aspects of the present subject matter.

Figure 1:
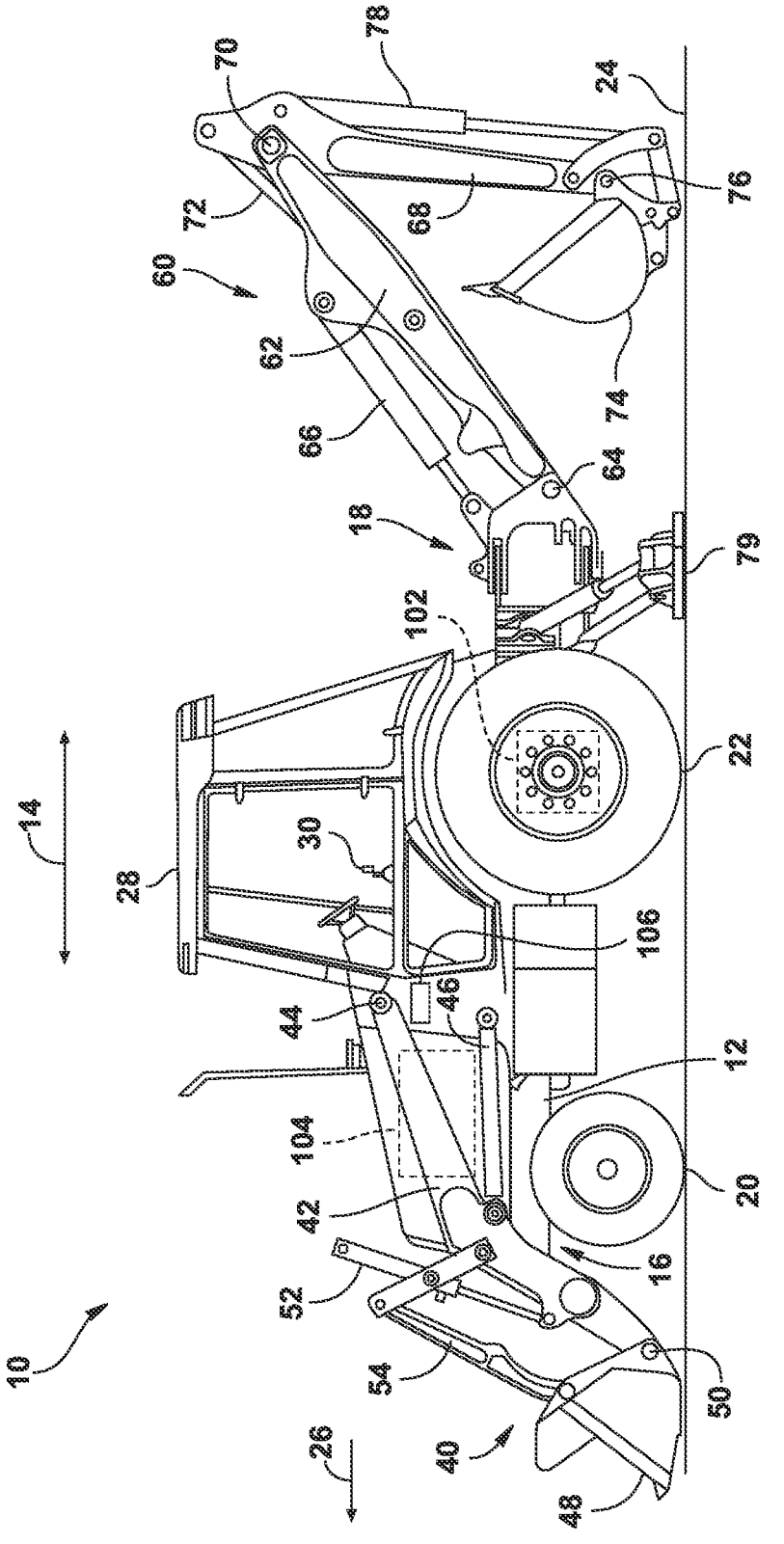
FIG. 1 illustrates a side view of one embodiment of an electric work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an electric work vehicle having a charging system and an associated method. As will be described below, the electric work vehicle includes one or more electric motors configured to drive one or more traction device(s) (e.g., a wheel(s), a track assembly(ies), etc.) of the electric work vehicle. Furthermore, the electric work vehicle includes one or more energy storage devices (e.g., a battery module) configured to supply electric energy to the electric motor(s). In addition, the electric work vehicle includes an electric charging port configured to receive electric power from a power source (e.g., the electric power grid). The electric charging port, in turn, is electrically coupled to the energy storage device(s), thereby permitting at least a portion of the electric power received by the electric charging port to charge the energy storage device(s) in certain instances. Moreover, the electric work vehicle includes an electric outlet configured to provide electric power to a remote device(s), such as a power tool(s). The electric outlet, in turn, is electrically coupled to the electric charging port and the energy storage device, thereby permitting the electric outlet to receive electric power from the electric charging port and/or the energy storage device(s).

Additionally, a computing system is configured to control the distribution of the electric power received by the electric charging port between the energy storage device(s) and the electric outlet. Specifically, when a remote device(s) is not electrically coupled to the electric outlet, the computing system may control the distribution of the electric power such that the energy storage device(s) is charged by the electric power received by the electric charging port at the any rate within the capacity of the power source. Conversely, when a remote device(s) is electrically coupled to the electric outlet, the computing system may control the distribution of the electric power such that charging/operation of the remote device(s) is prioritized over charging of the energy storage device(s). For example, when the charging capacity of the electric power received by the electric charging port exceeds the power draw of the remote device(s), a first portion of the received electric power is supplied to the electric outlet and a second portion of the received electric power is supplied to the energy storage device(s). Moreover, in one embodiment, when the power draw by the remote device(s) exceeds the charging capacity of the electric power received by the electric charging port, the computing system may initiate the supply of additional power from the energy storage device(s) to meet the power draw requirement(s) of the remote device(s).

The disclosed electric work vehicle, system, and method provide prioritized charging of remote device(s) (e.g., a power tool(s)), while still allowing for simultaneous charging of the energy storage device(s) of the electric work vehicle from a single power source when extra charging capacity is available. In this respect, the disclosed electric work vehicle, system, and method allow for a single power source to charge multiple electrically powered devices (e.g., the electric work vehicle and the remote device(s)) in a minimum amount of time. This, in turn, improves work site productivity and simplifies management of the charging of such devices.

Referring now to the drawings, FIG. 1 illustrates a side view of one embodiment of an electric work vehicle 10 in accordance with aspects of the present subject matter. As shown, the electric work vehicle 10 is configured as an electric backhoe loader (also often referred to as a "tractor-loader-backhoe" (TLB) or a "loader backhoe"). However, in other embodiments, the electric work vehicle 10 may be configured as any other suitable type of electric work vehicle, such as another type of electric construction vehicle (e.g., a wheel loader, a skid-steer loader, a bulldozer, etc.), an electric agricultural vehicle (e.g., a tractor), and/or the like.

As shown in FIG. 1, the electric work vehicle 10 includes a chassis or frame 12 extending in a longitudinal direction (indicated by arrow 14 in FIG. 1) of the electric work vehicle 10 between a forward end 16 of the frame 12 and an aft end 18 of the frame 12. In general, the chassis or frame 12 may be configured to support or couple to a plurality of components. For example, a pair of steerable front traction devices (e.g., front wheels 20 (one of which is shown)) and a pair of driven rear traction devices (e.g., rear wheels 22 (one of which is shown)) may be coupled to the frame 12. The wheels 20, 22 may support the electric work vehicle 10 relative to a ground surface 24 and move the electric work vehicle 10 along the ground surface 24 in a direction of travel, such as a forward direction of travel (indicated by arrow 26 in FIG. 1). However, in alternative embodiments, the front wheels 20 may be driven in addition to or in lieu of the rear wheels 22. Moreover, in other embodiments, the front and/or rear traction devices may be configured as track assemblies (not shown). Additionally, an operator's cab 28 may be supported by a portion of the frame 12 positioned between the forward and aft ends 16, 18 of the frame 12, and may house one or more operator control devices 30 (e.g., a joystick(s), a lever(s), and/or the like) for permitting an operator to control the operation of the electric work vehicle 10.

The electric work vehicle 10 also includes a pair of work implement assemblies positioned at the opposed ends 16, 18 of the frame 12. Specifically, in the illustrated embodiment, the electric work vehicle 10 includes a loader assembly 40 supported by or relative the frame 12 at or adjacent to its forward end 16. As shown in FIG. 1, the loader assembly 40 includes a loader arm 42 pivotably coupled or supported relative to the frame 12 at a loader arm pivot point 44, and a loader lift cylinder 46 secured between the loader arm 42 and the frame 12. In such an embodiment, extension/retraction of the loader lift cylinder 46 may result in the loader arm 42 pivoting upwards/downwards about its respective pivot point 44, thereby allowing the positioning of the loader arm 42 relative to both the frame 12 and the ground surface 24 to be adjusted, as desired. Moreover, as shown in FIG. 1, the loader assembly 40 further includes a first work implement 48, such as a loader bucket, coupled to the loader arm 42 at an implement pivot point 50, and a first implement tilt cylinder 52 secured between the work implement 48 (e.g., via a linkage(s) 54) and a portion of the loader arm 42. As such, extension/retraction of the first implement tilt cylinder 52 may result in the first work implement 48 pivoting upwards/downwards relative to the loader arm 42 about its respective pivot point 50, thereby permitting the tilt angle or orientation of the implement 48 to be adjusted, as desired. Thus, by controlling the operation of the lift and tilt cylinders 46, 52 of the loader assembly 40, the vertical positioning and orientation of the first work implement 48 may be adjusted to allow for the execution of one or more operations, such as one or more material-moving operations.

Additionally, in the illustrated embodiment, the electric work vehicle 10 includes a backhoe assembly 60 supported by or relative to the frame 12 at or adjacent to its aft end 18. As shown in FIG. 1, the backhoe assembly 60 includes a boom 62 pivotably coupled or supported relative to the frame 12 at a boom pivot point 64, and a boom lift cylinder 66 secured between the boom 62 and the frame 12. In such an embodiment, extension/retraction of the boom cylinder 66 may result in the boom 62 pivoting upwards/downwards about its respective pivot point 64, thereby allowing the positioning of the boom 62 relative to both the frame 12 and the ground surface 24 to be adjusted, as desired. The backhoe assembly 60 also includes a dipper arm 68 coupled to the boom 62 at a dipper pivot point 70, and a dipper cylinder 72 secured between the dipper arm 68 and the boom 62. In such an embodiment, extension/retraction of the dipper cylinder 72 may result in the dipper arm 68 pivoting upwards/downwards about its respective pivot point 70 relative to the boom 62. Moreover, as shown in FIG. 1, the backhoe assembly 60 further includes a second work implement 74, such as a dipper bucket, coupled to the dipper arm 68 at an implement pivot point 76, and a second implement tilt cylinder 78 secured between the work implement 74 and a portion of the dipper arm 68. As such, extension/retraction of the second implement tilt cylinder 78 may result in the second work implement 74 pivoting upwards/downwards relative to the dipper arm 68 about its respective pivot point 76, thereby permitting the tilt angle or orientation of the implement 74 to be adjusted, as desired. Thus, by controlling the operation of the various cylinders 66, 72, 78 of the backhoe assembly 60, the vertical positioning and orientation of the second work implement 74 may be adjusted to allow for the execution of one or more operations, such as one or more material excavation operations.

As shown in FIG. 1, the electric work vehicle 10 may also include a pair of stabilizer legs 79 (one of which is shown) positioned at or adjacent to the aft end 18 of the frame 12. The stabilizer legs 79 may be configured to support the weight of the electric work vehicle 10 and/or otherwise stabilize the electric work vehicle 10 during the performance of a backhoe-related operation. For instance, the stabilizer legs 79 may be pivotably coupled to the frame 12 to allow the legs 79 to be moved or pivoted (e.g., via the operation of an associated stabilizer leg cylinder) between a lowered position, at which the legs 79 contact the ground surface 24, and a raised position, at which the legs 79 are lifted off the ground surface 24 to allow movement of the electric work vehicle 10 (e.g., in the forward direction of travel 26). In addition to lowering the stabilizer legs 79, the loader assembly 40 may also be lowered during the performance of a backhoe-related operation such that the first work implement 48 contacts the ground, thereby providing a point-of-contact to stabilize the front end 16 of the frame 12.

Furthermore, the electric work vehicle 10 includes one or more electric motors 102 supported on the frame 12. In general, the electric motor(s) 102 is configured to drive one or more of the traction devices of the electric work vehicle 10 to propel the vehicle 10 in the direction of the travel (e.g., in the forward direction of travel 26). For example, in the illustrated embodiment, a pair of electric motors 102 (one of which is shown) are coupled to and configured to rotationally drive the rear wheels 22. However, in alternative embodiments, the electric work vehicle 10 may include any other suitable number of electric motors 102 (e.g., a single electric motor 102 or three or more electric motors 102). Moreover, in other embodiments, the electric motor(s) 102 may be configured to drive any other suitable traction device(s) of the vehicle 10 (e.g., the front wheels 20 in lieu or in addition to the rear wheels 22).

Additionally, the electric work vehicle 10 includes one or more energy storage device(s) 104 supported on the frame 12. In general, the energy storage device(s) 104 is configured to supply electric energy to the electric motor(s) 102. In the illustrated embodiment, the electric work vehicle 10 includes a single energy storage device 104. However, in alternative embodiments, the electric work vehicle 10 may include any other suitable number of energy storage device(s) 104, such as two or more energy storage devices 104. Moreover, the energy storage device(s) 104 may be configured as any suitable electro-chemical device(s) for storing electric energy. For example, in some embodiments, the energy storage device(s) 104 may be configured as a lithium-ion battery module(s) having any suitable number of batteries or cells. However, in alternative embodiments, the energy storage device(s) 104 may be configured as a nickel metal hydride battery module(s), a lead acid battery module(s), and/or the like.

In addition, the electric work vehicle 10 includes a charging station 106. In general, the charging station 106 is configured to receive electric power from a power source (e.g., the power grid). Moreover, the charging station 106 is configured to supply electric power to one or more remote device(s) (e.g., a power tool(s)). As will be described below, the electric power received by the charging station 106 can either be used to charge the energy storage device(s) 104 and/or charge/power the remote device(s). In this respect, the charging station 106 is an interface between the power source, the remote device(s), and the energy storage device(s) 104. In the illustrated embodiment, the electric work vehicle 10 includes a single charging station 106 located adjacent to the cab 28 to provide the operator with easy access to the charging station 106. However, in alternative embodiments, the electric work vehicle 10 may include any other suitable number of charging stations 106 and/or the charging station(s) 106 may be located at any other suitable location(s) on the vehicle 10.

Figure 2:
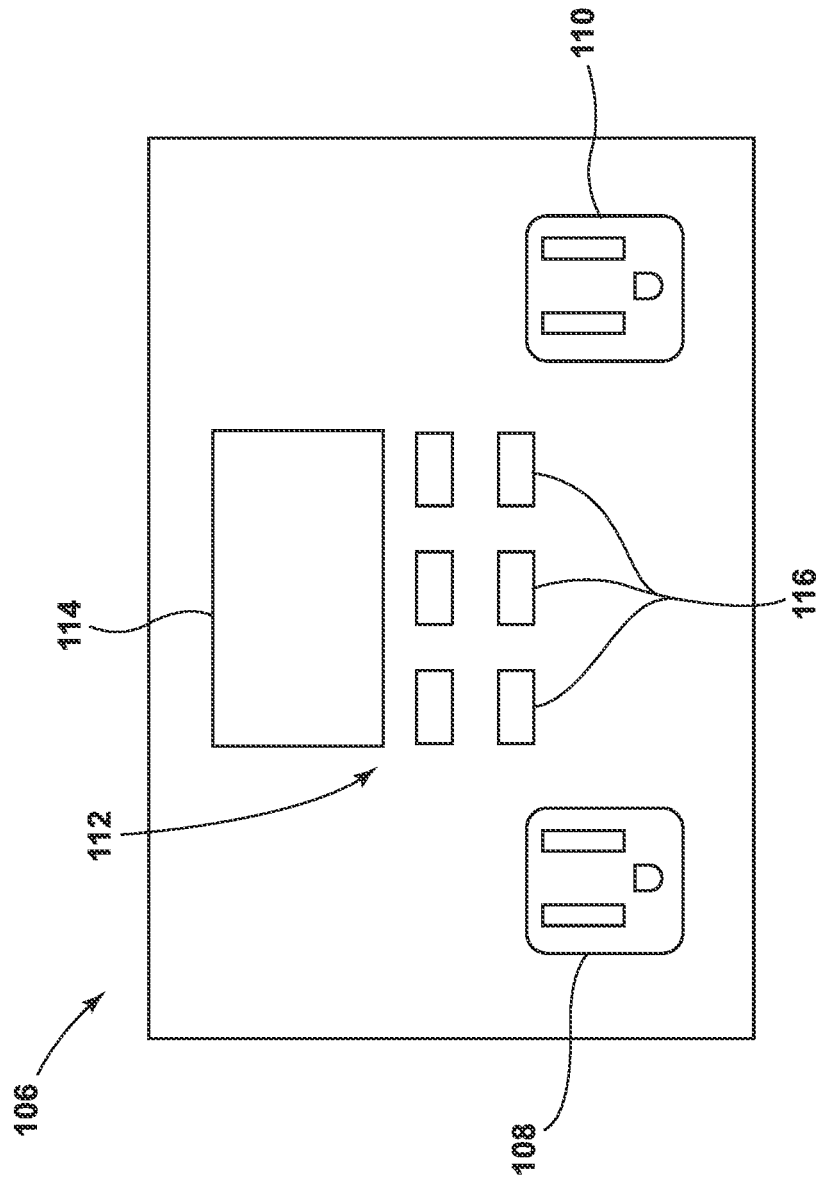
FIG. 2 illustrates a front view of one embodiment of a charging station of an electric work vehicle in accordance with aspects of the present subject matter.

FIG. 2 illustrates a front view of one embodiment of the charging station 106 in accordance with aspects of the present subject matter. As shown, the charging station 106 includes an electric charging port 108. In general, the electric charging port 108 is configured to receive electric power from a power source (e.g., the electric power grid, an electric generator, a mobile battery pack, etc.). As such, the electric charging port 108 forms part of a mechanical interface that allows the electric work vehicle 10 to receive electric power from the power source. In the illustrated embodiment, the electric charging port 108 is configured as a male or female electrical receptacle provided on the electric work vehicle 10. However, in alternative embodiments, the electric charging port 108 may be configured as any other suitable device for coupling a power source, such as an electric power cord or cable extending outward from the electric work vehicle 10.

Furthermore, the charging station 106 includes an electric outlet 110. In general, the electric outlet 110 is configured to provide electric power to one or more remote devices (e.g., a power tool(s) being used at the work site along with the electric work vehicle 10). In this respect, the electric outlet 110 forms part of a mechanical interface that allows the electric work vehicle 10 to provide or transmit electric power to the remote device(s). In the illustrated embodiment, the electric outlet 110 is configured as a male or female electrical receptacle provided on the electric work vehicle 10. However, in alternative embodiments, the electric outlet 110 may be configured as any other suitable device for coupling a remote device, such as an electric power cord or cable extending outward from the electric work vehicle 10.

For purposes of clarity, the electric work vehicle 10 and the associated charging system and method will be described herein in the context of having a single electric charging port 108 and a single electric outlet 110. However, the charging station 106 of the electric work vehicle 10 may have any suitable number of electric charging ports 108. For example, in one embodiment, the charging station 106 may include multiple electric charging ports 108 to allow the electric work vehicle 10 to receive electric power from multiple power sources, if available. Similarly, the charging station 106 of the electric work vehicle 10 may have any suitable number of electric outlets 110. For example, in one embodiment, the charging station 106 may include multiple electric outlets 110 to allow the electric work vehicle 10 to charge or power multiple remote devices.

Additionally, in several embodiments, the charging station 106 may include a user interface 112. More specifically, the user interface 112 may be configured to receive inputs (e.g., inputs associated with the charging capacity of the power source) from the operator. As such, the user interface 112 may include one or more input devices 116, such as touchscreens, keypads, touchpads, knobs, buttons, sliders, switches, mice, microphones, and/or the like, which are configured to receive inputs from the operator. As will be described below, such inputs may, in turn, be transmitted to a computing system for use in controlling the operation of the electric work vehicle 10 and/or the associated charging system. Moreover, in some embodiments, of the user interface 112 may include one or more feedback devices 114, such as display screens, speakers, warning lights, and/or the like, which are configured to provide feedback from the computing system to the operator (e.g., feedback associated with the charging capacity of the power source and/or the power draw from the remote device(s)). Alternatively, the user interface 112 may be positioned at a separate location from the charging station 106, such as within the cab 28 of the electric work vehicle 10.

The configuration of the electric work vehicle 10 described above and shown in FIGS. 1 and 2 is provided only to place the present subject matter in an exemplary field of use. Thus, the present subject matter may be readily adaptable to any manner of electric vehicle configuration.

Figure 3:
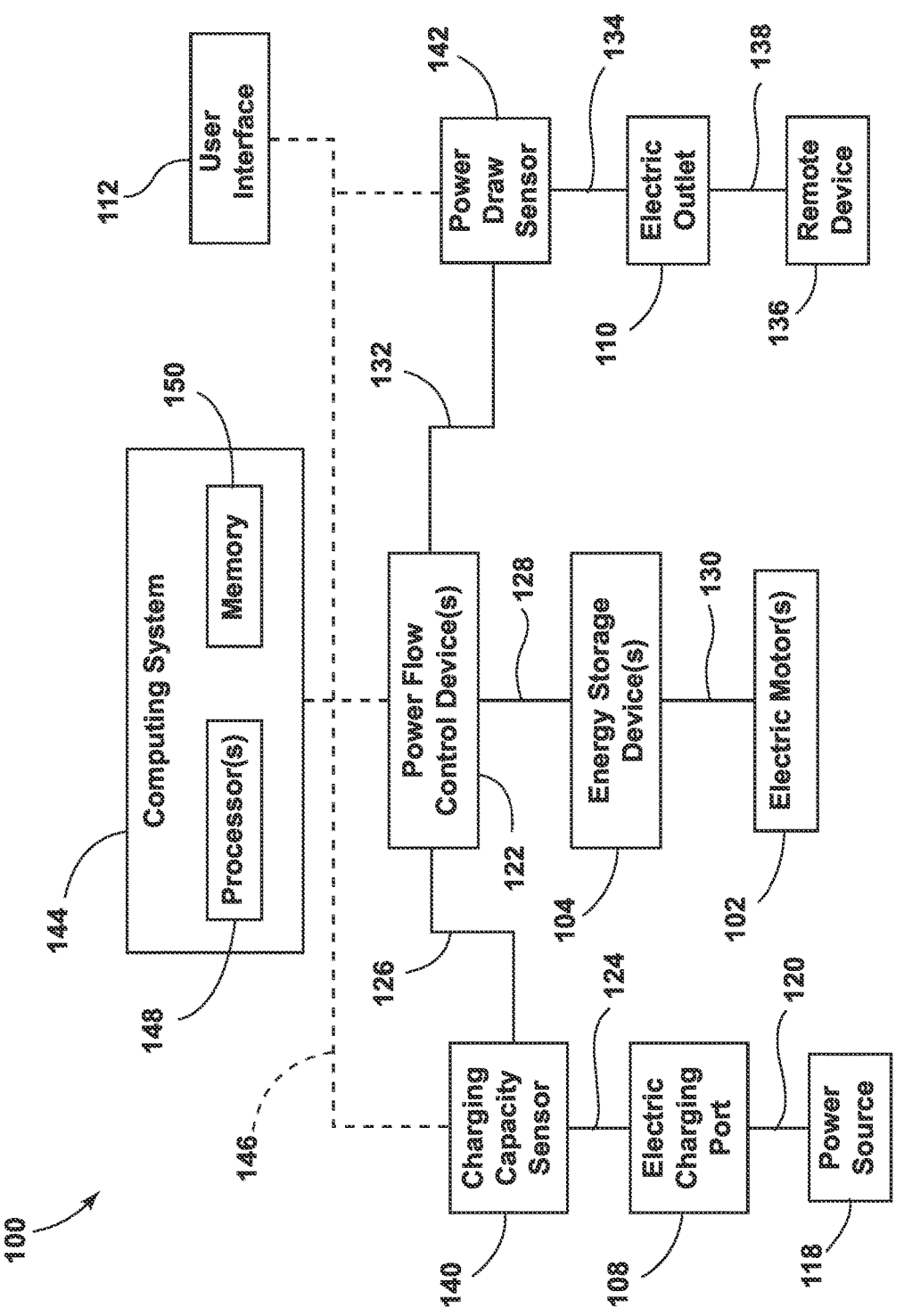
FIG. 3 illustrates a schematic view of one embodiment of a system for charging an electric work vehicle in accordance with aspects of the present subject matter.

Referring now to FIG. 3, a schematic view of one embodiment of a system 100 for charging an electric work vehicle is illustrated in accordance with aspects of the present subject matter. In general, the system 100 will be described herein with reference to the electric work vehicle 10 described above with reference to FIGS. 1 and 2. However, it should be appreciated by those of ordinary skill in the art that the disclosed system 100 may generally be utilized with electric work vehicles having any other suitable vehicle configuration.

As shown in FIG. 3, the electric charging port 108 is electrically coupled to the energy storage device(s) 104 of the electric work vehicle 10. For example, in the illustrated embodiment, the electric charging port 108 is electrically coupled to the energy storage device(s) 104 via electrical connections 124, 126, 128. Moreover, in the illustrated embodiment, the electric charging port 108 is electrically coupled to a power source 118 via a power cord or cable 120. Thus, the electric charging port 108 may receive electric power received from the power source 118 via the power cable 120. The received electric power may then be transmitted to the energy storage device(s) 104 via the electrical connections 124, 126, 128. Electric power from the energy storage device(s) 104 may then be transmitted to the electric motor(s) 102 via an electric connection 130. However, in alternative embodiments, the electric charging port 108 and the energy storage device(s) 104 may be electrically coupled in any other suitable manner.

The power source 118 may correspond to any suitable source of electric power. For example, the power source 118 may correspond to the electric power grid, an electric generator (e.g., powered by an internal combustion engine), a battery cart, and/or the like.

Furthermore, the electric charging port 108 is electrically coupled to the electric outlet 110 of the electric work vehicle 10. For example, in the illustrated embodiment, the electric charging port 108 is electrically coupled to the energy electric outlet 110 via electrical connections 124, 126, 132, 134. Moreover, in the illustrated embodiment, the electric outlet 110 is electrically coupled to a remote device 136 via a power cord or cable 138. Thus, electric power received by the electric charging port 108 may then be transmitted to the electric outlet 119 via the electrical connections 124, 126, 132, 134. The electric power received by the electric outlet 110 may, in turn, be transmitted to the remote device 135 via the power cable 138. However, in alternative embodiments, the electric charging port 108 and the energy storage device (s) 104 may be electrically coupled in any other suitable manner.

The remote device 136 may correspond to any suitable electrically power device that is separate from or otherwise remote from the electric work vehicle 10. For example, the remote device 136 may correspond to a power tool (e.g., a drill, saw, etc.), an electronic computing device (e.g., a laptop, Smartphone, tablet, etc.), and/or the like. Moreover, although a single remote device 136 is shown in FIG. 3, any suitable number of remote devices 136 may be electrically coupled to the system 100, such as when the electric work vehicle 10 includes multiple electric outlets 110.

In addition, the system 100 includes one or more power flow control devices 122. In general, the power flow control device(s) 122 is configured to control the flow or distribution of the electric power received by the electric charging port 108 between the energy storage device(s) 104 and the electric outlet 110. As such, the power flow control device(s) 122 is electrically coupled to the electric charging port 108 via the electrical connections 120, 124, 126. Furthermore, the power flow control device(s) 122 is electrically coupled to the energy storage device(s) 104 via the electrical connection 128. Additionally, the power flow control device(s) 122 is electrically coupled to the electric outlet 110 via the electrical connections 132, 134. However, in alternative embodiments, the power flow control device(s) 122, the energy storage device(s) 104, and the electric outlet 110 may be electrically coupled in any other suitable manner. As will be described below, the power flow control device(s) 122 may direct all or a portion of the electric power received by the electric charging port 108 to the energy storage device(s) 104 and/or all or a portion of the electric power received by the electric charging port 108 to the electric outlet 110.

The power flow control device(s) 122 may be configured as any suitable device or combination of devices to control the flow of electric power between the energy storage device(s) 104 and the electric outlet 110. In this respect, the power flow control device(s) 122 may correspond to any combination and/or number of switches, relays, transistors, and/or the like.

Additionally, the various electric connections 124, 126, 128, 132, 134 may be configured as any suitable type(s) of device(s) configured to transmit electric power between components. For example, the electric connections 124, 126, 128, 132, 134 may be configured as electric wires, cables, bus bars, and/or the like.

Furthermore, in several embodiments, the system 100 may include a charging capacity sensor 140. In general, the charging capacity sensor 140 is configured to generate data indicative of the charging capacity of the electric power received by the electric charging port 108. As such, the charging capacity sensor 140 may be electrically coupled between the electric charging port 108 and the power flow control device(s) 122. As will be described below, the data generated by the charging capacity sensor 140 may be used to control the distribution the electric power received by the electric charging port 108 between the energy storage device(s) 104 and the electric outlet 110. The charging capacity sensor 140 may be configured as any suitable type of sensing device(s) configured to generate data indicative of the charging capacity of the received electric power, such as an ammeter, a power consumption sensor, and/or the like.

As used herein, the charging capacity of the electric power received by the electric charging port 108 may correspond to any suitable parameter indicative of the ability of the received electric power to charge and/or power an electric device. For example, the charging capacity of the received electric power may be the current (e.g., amperage) of the electric power, the power/energy per unit time (e.g., wattage) of the electric power, and/or the like.

Additionally, in several embodiments, the system 100 may include a power draw sensor 142. In general, the power draw sensor 142 is configured to generate data indicative of the power draw from the remote device 136. As such, the power draw sensor 142 may be electrically coupled between the power flow control device(s) 122 and the electric outlet 110. As will be described below, the data generated by the power draw sensor 142 may be used to control the distribution the electric power received by the electric charging port 108 between the energy storage device(s) 104 and the electric outlet 110. The power draw sensor 142 may be configured as any suitable type of sensing device(s) configured to generate data indicative of the power draw of the remote device 136, such as an ammeter, a power consumption sensor, and/or the like.

As used herein, the power draw of the remote device 136 may correspond to any suitable parameter indicative of the amount of power drawn or being consumed by the remote 136. For example, the power draw of the remote device 136 may be the current (e.g., amperage) being pulled by the remote device 136, the power/energy per unit time (e.g., wattage) being consumed by the remote device 136, and/or the like.

Moreover, the system 100 includes a computing system 144 communicatively coupled to one or more components of the electric work vehicle 10 and/or the system 100 to allow the operation of such components to be electronically or automatically controlled by the computing system 144. For instance, the computing system 144 may be communicatively coupled to the charging capacity sensor 140 via a communicative link 146. As such, the computing system 144 may be configured to receive data from the charging capacity sensor 140 that is indicative of the charging capacity of the electric power being received by the electric charging port 108. Additionally, the computing system 144 may be communicatively coupled to the power draw sensor 142 via the communicative link 146. In this respect, the computing system 144 may be configured to receive data from the power draw sensor 142 that is indicative of the power draw from the remote device 136. Furthermore, the computing system 144 may be communicatively coupled to the power flow control device(s) 122 via the communicative link 146. As such, the computing system 144 may be configured to control the operation of the power flow control device(s) 122 to control the distribution of electric power between the energy storage device(s) 104 and the electric outlet 110. In addition, the computing system 144 may be communicatively coupled to the user interface 112 via the communicative link 146. As such, the computing system 144 may be configured to receive operator inputs from the user interface 112. Additionally, the computing system 144 may be communicatively coupled to any other suitable components of the electric work vehicle 10 and/or the system 100.

In general, the computing system 144 may comprise one or more processor-based devices, such as a given controller or computing device or any suitable combination of controllers or computing devices. Thus, in several embodiments, the computing system 144 may include one or more processor(s) 148 and associated memory device(s) 150 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 150 of the computing system 144 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 150 may generally be configured to store suitable computer-readable instructions that, when implemented by the processor(s) 148, configure the computing system 144 to perform various computer-implemented functions, such as one or more aspects of the methods and algorithms that will be described herein. In addition, the computing system 144 may also include various other suitable components, such as a communications circuit or module, one or more input/output channels, a data/control bus and/or the like.

The various functions of the computing system 144 may be performed by a single processor-based device or may be distributed across any number of processor-based devices, in which instance such devices may be considered to form part of the computing system 144. For instance, the functions of the computing system 144 may be distributed across multiple application-specific controllers or computing devices, such as a navigation controller, an engine controller, a transmission controller, an implement controller, and/or the like.

Figure 4:
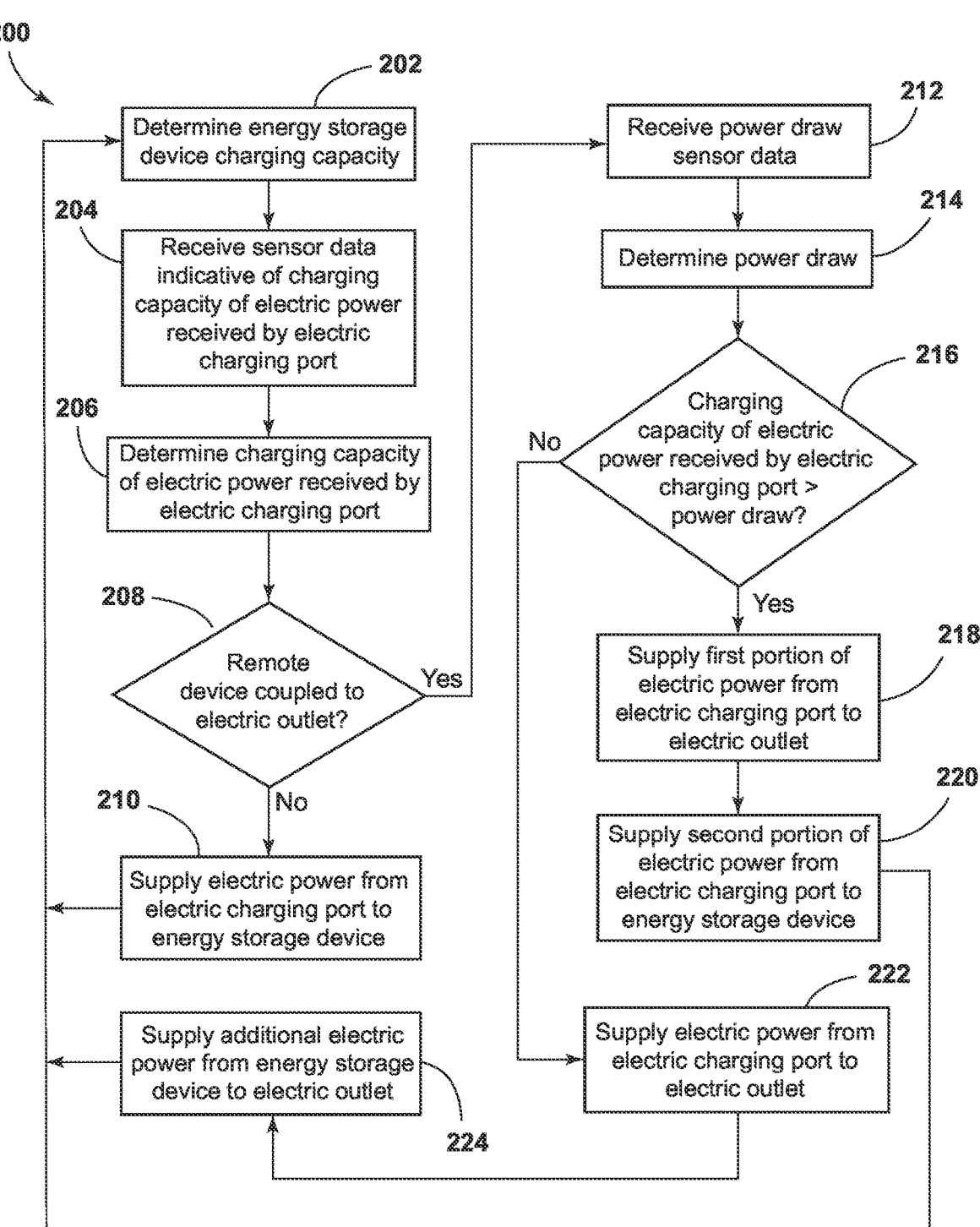
FIG. 4 illustrates a flow diagram providing one embodiment of control logic for charging an electric work vehicle in accordance with aspects of the present subject matter.

Referring now to FIG. 4, a flow diagram of one embodiment of example control logic 200 that may be executed by the computing system 144 (or any other suitable computing system) for charging an electric work vehicle is illustrated in accordance with aspects of the present subject matter. Specifically, the control logic 200 shown in FIG. 4 is representative of steps of one embodiment of an algorithm that can be executed to charge an electric work vehicle and one or more remote devices in a manner that allows for a single power source to charge multiple electrically powered devices in a minimum amount of time. Thus, in several embodiments, the control logic 200 may be advantageously utilized in association with a charging system installed on or forming part of an electric work vehicle to allow for real-time control of vehicle and remote device electric charging without requiring substantial computing resources and/or processing time. However, in other embodiments, the control logic 200 may be used in association with any other suitable system, application, and/or the like for charging an electric work vehicle.

As shown, at (202), the control logic 200 includes determining the charging capacity of an energy storage device of an electric work vehicle. Specifically, in several embodiments, the computing system 144 may be configured to determine the charging capacity of the energy storage device(s) 104 of the electric work vehicle 10. For example, in one embodiment, the computing system 144 may access the charging capacity of the energy storage device(s) 104 from its memory device(s) 150. In another embodiment, the operator of the electric work vehicle 10 may provide the charging capacity of the energy storage device(s) 104 via the user interface 112. However, in alternative embodiments, the computing system 144 may be configured to determine the charging capacity of the energy storage device(s) 104 in any other suitable manner, such as via suitable sensor data.

As used herein, the charging capacity of the energy storage device(s) 104 may correspond to any suitable parameter indicative of amount or nature of the electric power that the energy storage device(s) 104 can accept and store. For example, the charging capacity of the energy storage device(s) 104 may be the current (e.g., amperage) of the electric power that can be accepted by the energy storage device(s) 104 during charging, the power/energy per unit time (e.g., wattage) of the electric power that can be accepted by the energy storage device(s) 104 during charging, and/or the like.

Furthermore, at (204), the control logic 200 includes receiving sensor data indicative of the charging capacity of the electric power received by an electric charging port of the electric work vehicle. Specifically, as mentioned above, in several embodiments, the computing system 144 may be communicatively coupled to the charging capacity sensor 140 via the communicative link 146. In this respect, when the electric charging port 108 is electrically coupled to the power source 118, the computing system 144 may receive data from the charging capacity sensor 140. Such data may, in turn, be indicative of the charging capacity of the electric power received by the electric charging port 108 from the power source 118.

Additionally, at (206), the control logic 200 includes determining the charging capacity of the electric power received by the electric charging port of the electric work vehicle. Specifically, in several embodiments, the computing system 144 may be configured to analyze the sensor data received at (204) to determine the charging capacity of the electric power received by the electric charging port 108 from the power source 118. Alternatively, the charging capacity of the electric power received by the electric charging port 108 may be determined based on an operator input received from the user interface 112. As will be described below, the computing system 144 is configured to control the distribution the electric power received by the electric charging port 108 between the energy storage device(s) 104 and the electric outlet 110 based on the determined the charging capacity of the electric power received by the electric charging port 108 and the charging capacity of the energy storage device(s) 104.

Moreover, at (208), the control logic 200 includes determining whether a remote device is electrically coupled to an electric outlet of the electric work vehicle. Specifically, in several embodiments, the computing system 144 may be configured to determining when the remote device 136 is electrically coupled to the electric outlet 110 of the electric work vehicle 10. For example, the computing system 144 may determine when the remote device 136 is electrically coupled to the electric outlet 110 based on sensor data that is indicative the presence or lack of an electric load on the electric outlet 110, sensor data that is indicative a mechanical connection between the electric outlet 110 and the remote device 136, and/or the like. When a remote device is not electrically coupled to the electric outlet 110, the control logic 200 proceeds to (210). As will be described below, in such instances, the electric power received by the electric charging port 108 is used to charge the energy storage device(s) 104. Conversely, when a remote device is electrically coupled to the electric outlet 110, the control logic 200 proceeds to (212). As will be described below, in such instances, the charging/powering of the remote device 136 is prioritized over the charging the energy storage device(s) 104.

In addition, at (210), the control logic 200 includes initiating the supply of electric power from the electric charging port to the energy storage device of the electric work vehicle. In several embodiments, when no remote device is electrically coupled to the electric outlet 110, the computing system 144 may be configured to initiate the supply of electric power from the electric charging port 108 to the energy storage device(s) 104. Specifically, the computing system 144 may initiate the supply of electric power from the electric charging port 108 to the energy storage device(s) 104 in an amount equal to the lesser of the charging capacity of the energy storage device(s) 104 determined at (202) or the charging capacity of the electric power received by the electric charging port 108 determined at (206). For example, in such instances, the computing system 144 may transmit control signals to the power flow control device(s) 122. Such control signals, in turn, instruct the power flow control device(s) 122 to direct electric power from the electric charging port 108 to the energy storage device(s) 104 in the selected amount.

Thus, at (210), the energy storage device(s) 104 of the electric work vehicle 10 is charged at the maximum rate permitted by the charging capacities of the energy storage device(s) 104 and the electric power received by the electric charging port 108. For example, when the charging capacity of the energy storage device(s) 104 is sixty amps and the charging capacity of the electric power received by the electric charging port 108 is fifty amps, all fifty amps of electric power received by the electric charging port 108 is supplied to the energy storage device(s) 104 for charging. Conversely, when the charging capacity of the energy storage device(s) 104 is fifty amps and the charging capacity of the electric power received by the electric charging port 108 is sixty amps, only fifty amps of electric power received by the electric charging port 108 is supplied to the energy storage device(s) 104 for charging. Upon completion of (210), the control logic 200 returns to (202).

Conversely, at (212), the control logic 200 includes receiving sensor data indicative of the power draw from the remote device. Specifically, as mentioned above, in several embodiments, the computing system 144 may be communicatively coupled to the power draw sensor 142 via the communicative link 146. In this respect, when the remote device 136 is electrically coupled to the electric outlet 110 of the electric work vehicle 10, the computing system 144 may receive data from the power draw sensor 142. Such data may, in turn, be indicative of the power draw of the remote device 136.

Furthermore, at (214), the control logic 200 includes determining the power draw from the remote device. Specifically, in several embodiments, the computing system 144 may be configured to analyze the power draw sensor data received at (212) to determine the power draw from the remote device 136. As will be described below, the power draw from the remote device 136 may be used to in addition to the charging capacities of the energy storage device(s) 104 and the electric power received from the electric charging port 108 to control the distribution the electric power received by the electric charging port 108 between the energy storage device(s) 104 and the electric outlet 110.

Additionally, at (216), the control logic 200 includes determining whether the charging capacity of the electric power received by the electric charging port is greater than the power draw of the remote device. Specifically, in several embodiments, the computing system 144 may be configured to compare the charging capacity of the electric power received by the electric charging port 108 determined at (206) and the power draw from the remote device 136 determined at (214). When the charging capacity of the electric power received by the electric charging port 108 exceeds the power draw of the remote device 136, the control logic 200 proceeds to (218). Conversely, when the charging capacity of the electric power received by the electric charging port 108 does not exceed the power draw of the remote device 136, the control logic 200 proceeds to (222).

Moreover, at (218), the control logic 200 includes initiating the supply of a first portion of the electric power from the electric charging port to the electric outlet of the electric work vehicle. In several embodiments, when the charging capacity of the electric power received by the electric charging port 108 exceeds the power draw from the remote device 136, the computing system 144 may be configured to initiate the supply of a first portion of the electric power from the electric charging port 108 to the electric outlet 110. Specifically, the first portion of the electric power from the electric charging port 108 is supplied to the electric outlet 110 in an amount equal to the power draw from the remote device 136 determined at (214). For example, in such instances, the computing system 144 may transmit control signals to the power flow control device(s) 122. Such control signals, in turn, instruct the power flow control device(s) 122 to direct electric power from the electric charging port 108 to the electric outlet 110 in the selected amount.

In addition, at (220), the control logic 200 includes initiating the supply of a second portion of the electric power from the electric charging port to the energy storage device of the electric work vehicle. In several embodiments, when the charging capacity of the electric power received by the electric charging port 108 exceeds the power draw of the remote device 136, the computing system 144 may be configured to initiate the supply of a second portion of the electric power from the electric charging port 108 to the energy storage device(s) 104. Specifically, the second portion of the electric power from the electric charging port 108 is supplied to the electric outlet 110 in an amount equal to the difference between the charging capacity of the electric power received by the electric charging port 108 determined at (206) and the power draw from the remote device 136 determined at (214). For example, in such instances, the computing system 144 may transmit control signals to the power flow control device(s) 122. Such control signals, in turn, instruct the power flow control device(s) 122 to direct electric power from the electric charging port 108 to the energy storage device(s) 104 in the selected amount. Upon completion of (220), the control logic 200 returns to (202).

Conversely, at (222), the control logic 200 includes initiating the supply of electric power from the electric charging port to the electric outlet of the electric work vehicle. In several embodiments, when the charging capacity of the electric power received by the electric charging port 108 does not exceed the power draw of the remote device 136, the computing system 144 may be configured to initiate the supply of electric power from the electric charging port 108 to the electric outlet 110. Specifically, the computing system 144 may initiate the supply of electric power from the electric charging port 108 to the energy storage device(s) 104 in an amount equal to the lesser of the charging capacity of the electric power received by the electric charging port 108 determined at (206) or the power draw from the remote device 136 determined at (214). For example, in such instances, the computing system 144 may transmit control signals to the power flow control device(s) 122. Such control signals, in turn, instruct the power flow control device(s) 122 to direct electric power from the electric charging port 108 to the electric outlet in the selected amount.

Thus, at (218), (220), and (222), the charging/powering of the remote device 136 is prioritized over the charging of the energy storage device(s) 104 of the electric work vehicle 10. For example, when the charging capacity of the electric power received by the electric charging port 108 is sixty amps and the power draw of the remote device 136 is fifty amps, only fifty amps of the electric power received by the electric charging port 108 is supplied to the electric outlet 110 for use by the remote device 136. The remaining ten amps of the electric power received by the electric charging port 108 are supplied to the energy storage device(s) 104 for charging. Conversely, when the charging capacity of the electric power received by the electric charging port 108 is fifty amps and the power draw of the remote device 136 is sixty amps, all fifty amps of the electric power received by the electric charging port 108 is supplied to the electric outlet 110 for use by the remote device 136.

In some embodiments, the energy storage device(s) 104 may be configured to condition the electric power supplied to the electric outlet 110. Specifically, in such instances, even though the charging/operation of the remote device 136 is being prioritized over the charging of the energy storage device(s) 104, the electric power received from the power source 118 may initially be supplied to the energy storage device(s) 108. The energy storage device(s) 108 may, in turn, condition the received electric power before supplying the conditioned electric power to the electric outlet 110 in the amount described above for use by the remote device 136. For example, when the voltage of the electric power received by the electric charging port 108 differs from the desired charging/operating voltage of the remote device 136, the energy storage device(s) 104 may adjust the voltage of the electric power received by the electric charging port 108 to the appropriate voltage for the remote device 136 (e.g., bump the voltage up to 120 volts). Moreover, when the frequency of the electric power received by the electric charging port 108 differs from the desired charging/operating frequency of the remote device 136, the energy storage device(s) 104 may adjust the frequency of the electric power received by the electric charging port 108 to the appropriate frequency for the remote device 136 (e.g., to adjust the frequency to sixty Hertz). Alternatively, the energy storage device(s) 104 may adjust any other suitable parameter(s) of the electric power received by the electric charging port 108 to condition or otherwise clean up the received electric power for eventual use by the remote device 136. However, in other embodiments, the electric power received by the electric charging port 108 may be supplied directly to the electric outlet 110 in such instances.

Furthermore, at (224), the control logic 200 includes initiating the supply of additional electric power from the energy storage device of the electric work vehicle to the electric outlet of the electric work vehicle. In several embodiments, when the power draw from the remote device 136 exceeds the charging capacity of the electric power received by the electric charging port 108, the computing system 144 may be configured to initiate the supply of additional electric power from the energy storage device(s) 104 to the electric outlet 110. Specifically, the computing system 144 may initiate the supply of additional electric power from the energy storage device(s) 104 to the electric outlet 110 in an amount equal the difference between the power draw from the remote device 136 determined at (214) and the charging capacity of the electric power received by the electric charging port 108 determined at (206). For example, in such instances, the computing system 144 may transmit control signals to the power flow control device(s) 122. Such control signals, in turn, instruct the power flow control device(s) 122 to direct electric power from the energy storage device(s) 104 to the electric outlet 110 in the selected amount.

Such additional electric power from the energy storage device(s) 104 supplements the electric power received from the electric charging port 108 to provide sufficient electric power to the electric outlet 110 to accommodate the full power draw from the remote device 136. For example, when the charging capacity of the electric power received by the electric charging port 108 is fifty amps and the power draw of the remote device 136 is sixty amps, an additional ten amps of electric power from the energy storage device(s) 104 is supplied to the electric outlet 110 for use by the remote device 136. Upon completion of (224), the control logic 200 returns to (202).

Referring now to FIG. 5, a flow diagram of one embodiment of a method 300 for charging an electric work vehicle is illustrated in accordance with aspects of the present subject matter. In general, the method 300 will be described herein with reference to the electric work vehicle 10 and the system 100 described above with reference to FIGS. 1-4. However, it should be appreciated by those of ordinary skill in the art that the disclosed method 300 may generally be implemented with any electric work vehicle having any suitable vehicle configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 includes determining, with a computing system, the charging capacity of an energy storage device of an electric work vehicle. For instance, as described above, the computing system 144 may determine the charging capacity of the energy storage device(s) 104 of the electric work vehicle 10.

Furthermore, at (304), the method 300 includes determining, with the computing system, the charging capacity of electric power received by an electric charging port on the electric work vehicle. For instance, as described above, the computing system 144 may determine the charging capacity of the electric power received by the electric charging port 108 on the electric work vehicle 10, such as from data received from the charging capacity sensor 140 or an operator input provided to the user interface 112.

Additionally, at (306), the method 300 includes controlling, with the computing system, the distribution of the electric power received by the electric charging port between the energy storage device and an electric outlet based on at least one of the determined charging capacity of the energy storage device or the determined charging capacity of the electric power received by an electric charging port. For instance, as described above, the computing system 144 may control the operation of the power flow control device(s) 122 to control the distribution of the electric power received by the electric charging port 108 between the energy storage device(s) 104 and the electric outlet 110 based on the determined charging capacity of the energy storage device(s) 104 and/or the determined charging capacity of the electric power received by an electric charging port 108.

It is to be understood that the steps of the control logic 200 and the method 300 are performed by the computing system 144 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 144 described herein, such as the control logic 200 and the method 300, is implemented in software code or instructions which are tangibly stored on a tangible computer readable medium. The computing system 144 loads the software code or instructions via a direct interface with the computer readable medium or via a wired and/or wireless network. Upon loading and executing such software code or instructions by the computing system 144, the computing system 144 may perform any of the functionality of the computing system 144 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An electric work vehicle, comprising:
a frame;
a traction device coupled to the frame;
an electric motor configured to drive the traction device;
an energy storage device configured to supply electric energy to the electric motor;
an electric charging port configured to receive electric power from a power source, the electric charging port being electrically coupled to the energy storage device;
an electric outlet configured to provide electric power to a remote device, the electric outlet being electrically coupled to the electric charging port and the energy storage device;
a power flow control device electrically coupled to the energy storage device, the electric charging port, and the electric outlet, the power flow control device positioned between the electric charging port and the energy storage device such that the power flow control device controls a flow of the electric power received by the electric charging port between the energy storage device and the electric outlet; and
a computing system that controls an operation of the power flow control device such that a first portion of the electric power received by the electric charging port is supplied to the energy storage device and a second portion of the electric power received by the electric charging port is supplied to the electric outlet.

2. The electric work vehicle of claim 1, wherein the computing system:
determines a charging capacity of the energy storage device; and
determines a charging capacity of the electric power received by the electric charging port.

3. The electric work vehicle of claim 2, wherein the computing system determines when the remote device is electrically coupled to the electric outlet.

4. The electric work vehicle of claim 3, wherein, when the remote device is not electrically coupled to the electric outlet, the computing system further controls the operation of the power flow control device such that the first portion of the electric power is an amount equal to a lesser of the charging capacity of the energy storage device or the charging capacity of the electric power received by the electric charging port.

5. The electric work vehicle of claim 3, wherein, when the remote device is electrically coupled to the electric outlet, the computing system further determines an electric power draw from the remote device.

6. The electric work vehicle of claim 5, wherein, when the remote device is electrically coupled to the electric outlet, the computing system further controls the operation of the power flow control device such that the second portion of the electric power is an amount equal to a lesser of the charging capacity of the electric power received by the electric charging port or the electric power draw from the remote device.

7. The electric work vehicle of claim 6, wherein when the charging capacity of the electric power received by the electric charging port exceeds the electric power draw from the remote device, the computing system further controls the operation of the power flow control device such that the second portion of the electric power received by the electric charging port is an amount equal to a difference between the charging capacity of the electric power received by the electric charging port and the electric power draw from the remote device.

8. The electric work vehicle of claim 6, wherein, when the electric power draw from the remote device exceeds the charging capacity of the electric power received by the electric charging port, the computing system further: initiates supply of additional electric power from the energy storage device to the electric outlet in an amount equal to a difference between the electric power draw from the remote device and the charging capacity of the electric power received by the electric charging port.

9. The electric work vehicle of claim 5, further comprising:
a power draw sensor configured to generate data indicative of the electric power draw from the remote device, the power draw sensor being communicatively coupled to the computing system,
wherein the computing system further determines the electric power draw from the remote device based on the data generated by the power draw sensor.

10. The electric work vehicle of claim 2, further comprising:
a charging capacity sensor configured to generate data indicative of the charging capacity of the electric power received by the electric charging port, the charging capacity sensor being communicatively coupled to the computing system,
wherein the computing system further determines the charging capacity of the electric power received by the electric charging port based on the data generated by the charging capacity sensor.

11. The electric work vehicle of claim 2, wherein the computing system further determines the charging capacity of the electric power received by the electric charging port from the power source based on a user input.

12. A system for charging an electric work vehicle, the system comprising:
an electric motor configured to drive a traction device of the electric work vehicle;

an energy storage device configured to supply electric energy to the electric motor;

an electric charging port configured to receive electric power from a power source, the electric charging port being electrically coupled to the energy storage device;

an electric outlet configured to provide electric power to a remote device, the electric outlet being electrically coupled to the electric charging port and the energy storage device;

a power flow control device electrically coupled to the energy storage device, the electric charging port, and the electric outlet such that the power flow control device controls a flow of the electric power received by the electric charging port between the energy storage device and the electric outlet; and a computing system that controls an operation of the power flow control device such that a first portion of the electric power received by the electric charging port is supplied to the energy storage device and a second portion of the electric power received by the electric charging port is supplied to the electric outlet.

13. A method for charging an electric work vehicle, the electric work vehicle including an electric motor configured to drive a traction device of the electric work vehicle and an energy storage device configured to supply electric energy to the electric motor, the method comprising:

determining, with a computing system, a charging capacity of the energy storage device;

determining, with the computing system, a charging capacity of electric power received by an electric charging port on the electric work vehicle, the electric charging port configured to receive the electric power from a power source, the electric charging port being electrically coupled to the energy storage device; and controlling, with the computing system, an operation of a power flow control device such that a first portion of the electric power received by the electric charging port is supplied to the energy storage device and a second portion of the electric power received by the electric charging port is supplied to an electric outlet based on at least one of the determined charging capacity of the energy storage device or the determined charging capacity of the electric power received by the electric charging port, the electric outlet configured to provide electric power to a remote device, the electric outlet being electrically coupled to the electric charging port and the energy storage device.

14. The method of claim 13, further comprising:

determining, with the computing system, when the remote device is electrically coupled to the electric outlet.

15. The method of claim 14, wherein, when the remote device is not electrically coupled to the electric outlet, controlling the operation of the electric power comprises controlling, with the computing system, the operation of the power flow control device such that the first portion of the electric power is an amount equal to a lesser of the charging capacity of the energy storage device or the charging capacity of the electric power received by the electric charging port.

16. The method of claim 14, wherein, when the remote device is electrically coupled to the electric outlet, the method further comprises:

determining, with the computing system, an electric power draw from the remote device.

17. The method of claim 16, wherein, when the remote device is electrically coupled to the electric outlet, controlling the operation of the electric power comprises controlling, with the computing system, the operation of the power flow control device such that the second portion of the electric power is an amount equal to a lesser of the charging capacity of the electric power received by the electric charging port or the electric power draw from the remote device.

18. The method of claim 17, wherein when the charging capacity of the electric power received by the electric charging port exceeds the electric power draw from the remote device, controlling the operation of the power flow control device comprises controlling, with the computing system, the operation of the power flow control device such that the second portion of the electric power received by the electric charging port is an amount equal to a difference between the charging capacity of the electric power received by the electric charging port and the electric power draw from the remote device.

19. The method of claim 17, wherein, when the electric power draw from the remote device exceeds the charging capacity of the electric power received by the electric charging port, the method further comprising:

initiating, with the computing system, supply of additional electric power from the energy storage device to the electric outlet in an amount equal to a difference between the electric power draw from the remote device and the charging capacity of the electric power received by the electric charging port.

20. The method of claim 16, further comprising:

receiving, with the computing system, sensor data indicative of the electric power draw from the remote device, wherein determining the electric power draw from the remote device comprises determining, with the computing system, the electric power draw from the remote device based on the received sensor data.

* * * * *